United States Patent [19]

Fyock

[11] 4,048,871
[45] Sept. 20, 1977

[54] VARIABLE SPEED POWER TRANSMISSION FOR SMALL VEHICLES AND THE LIKE

[76] Inventor: Norman G. Fyock, R.D. No. 2, Box 400, Johnstown, Pa. 15904

[21] Appl. No.: 703,064

[22] Filed: July 6, 1976

Related U.S. Application Data

[63] Continuation-in-part of Ser. No. 592,384, July 2, 1975, abandoned.

[51] Int. Cl.² ............................ F16H 47/04; F16H 57/10
[52] U.S. Cl. .......................................... 74/687; 74/793; 74/790; 74/731; 74/740
[58] Field of Search .................. 74/790, 793, 730, 731, 74/732, 740, 745, 687, 688, 689

[56] References Cited

U.S. PATENT DOCUMENTS

| | | | |
|---|---|---|---|
| 2,286,485 | 6/1942 | Hild | 74/790 X |
| 2,964,977 | 12/1960 | Kopec | 74/687 X |
| 3,008,341 | 11/1961 | Cobb | 74/687 X |
| 3,023,638 | 3/1962 | Westbury et al. | 74/687 |
| 3,055,233 | 9/1962 | Giles | 74/687 |
| 3,411,381 | 11/1968 | Orshansky, Jr. | 74/687 |
| 3,469,472 | 9/1969 | Bislew | 74/740 X |
| 3,500,704 | 3/1970 | Muller et al. | 74/688 |
| 3,503,281 | 3/1970 | Gsching et al. | 74/687 X |
| 3,626,787 | 12/1971 | Singer | 74/687 |
| 3,905,251 | 9/1975 | Greene | 74/687 |

FOREIGN PATENT DOCUMENTS

| | | | |
|---|---|---|---|
| 568,719 | 1/1933 | Germany | 74/793 |
| 502,371 | 3/1939 | United Kingdom | 74/790 |

Primary Examiner—Samuel Scott
Assistant Examiner—Lance W. Chandler
Attorney, Agent, or Firm—Owen, Purdue, Emch & Barker

[57] ABSTRACT

A power transmission system for small vehicles or machinery having a principal forward speed and variable forward and reverse speeds capable of providing lower variable speeds is disclosed. The transmission system includes a primary transmission and a secondary transmission connected in series. In one of three positions, the two transmission housings and primary output shaft are keyed together. This results in a non-variable output, principal forward speed with a 1 to 1 ratio between the speed at which the engine rotates the primary transmission housing and the speed of the output shaft. In a second setting, the secondary transmission housing is keyed only to the output shaft from the primary transmission. This results in a forward speed having a variable output depending upon the load placed on the input shaft to the primary transmission. In a third position, the housings for the primary and secondary transmissions and the output shaft from the primary transmission are each disengaged from each other. In this setting, the secondary transmission functions to reverse the direction of the output shaft while the primary transmission functions to provide a variable gear ratio depending upon the load placed upon the input shaft to the primary transmission.

19 Claims, 4 Drawing Figures

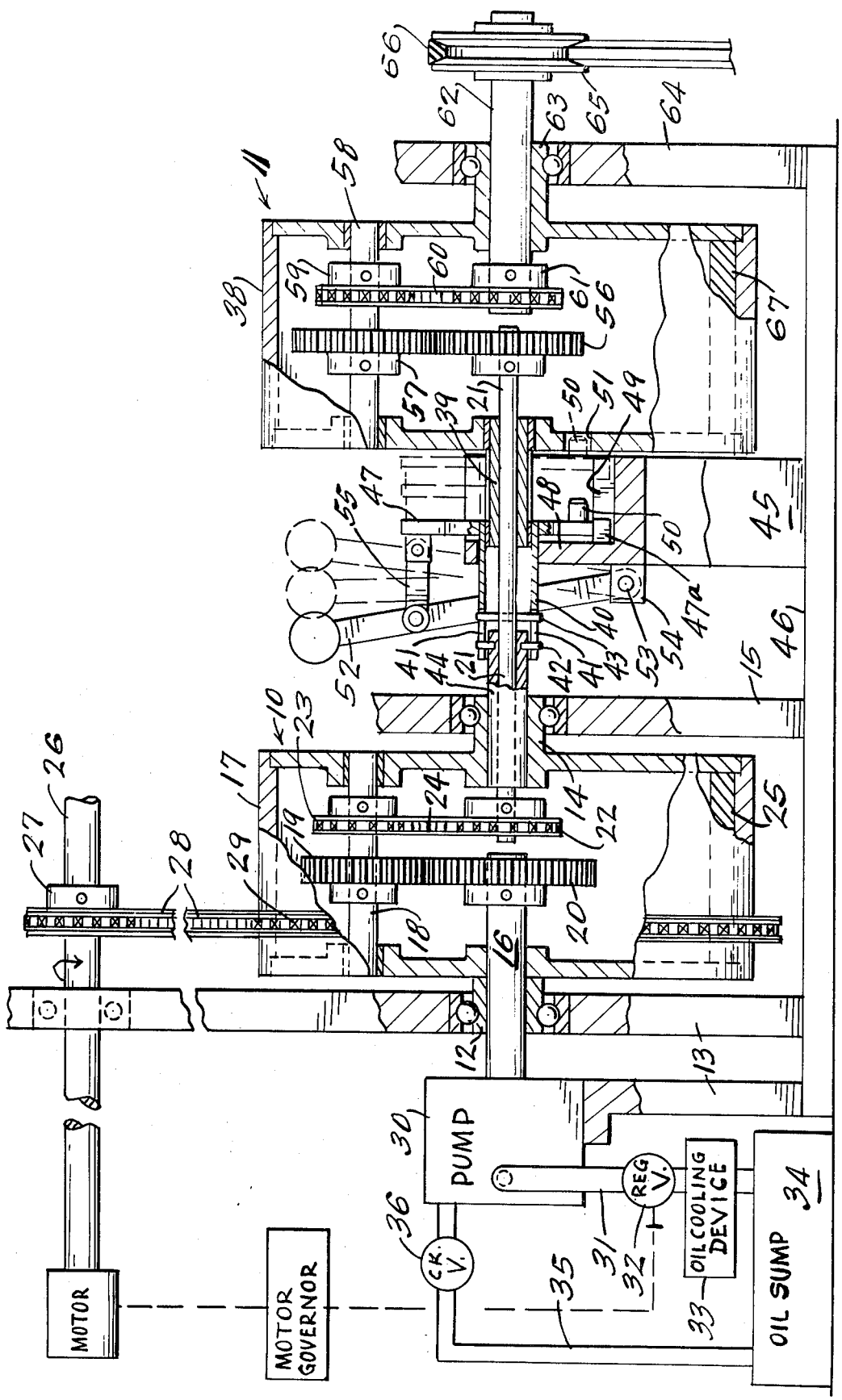
FIG-1-

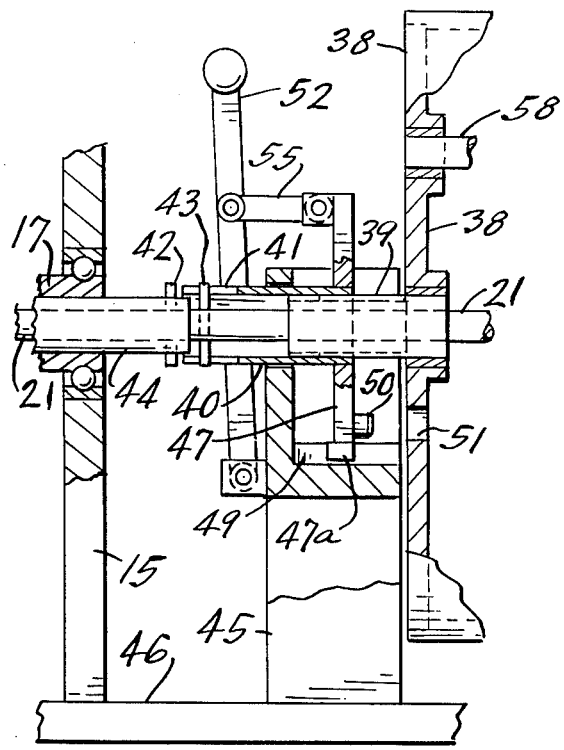
FIG-2-
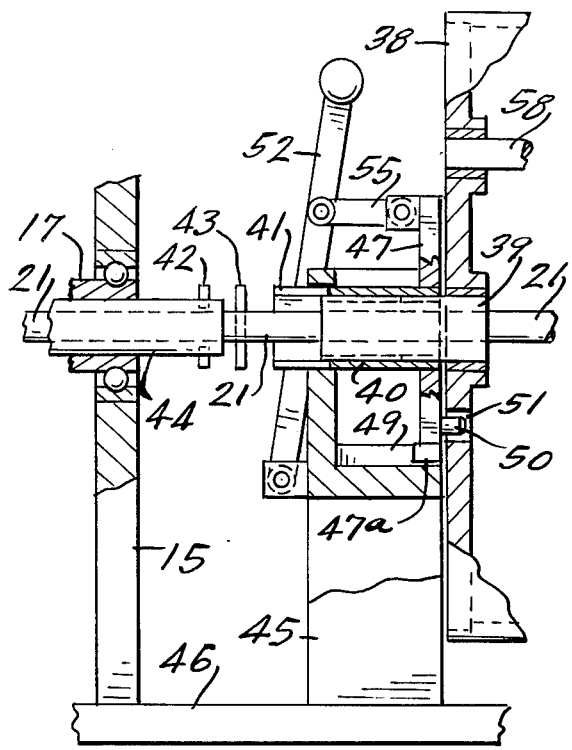
FIG-3-
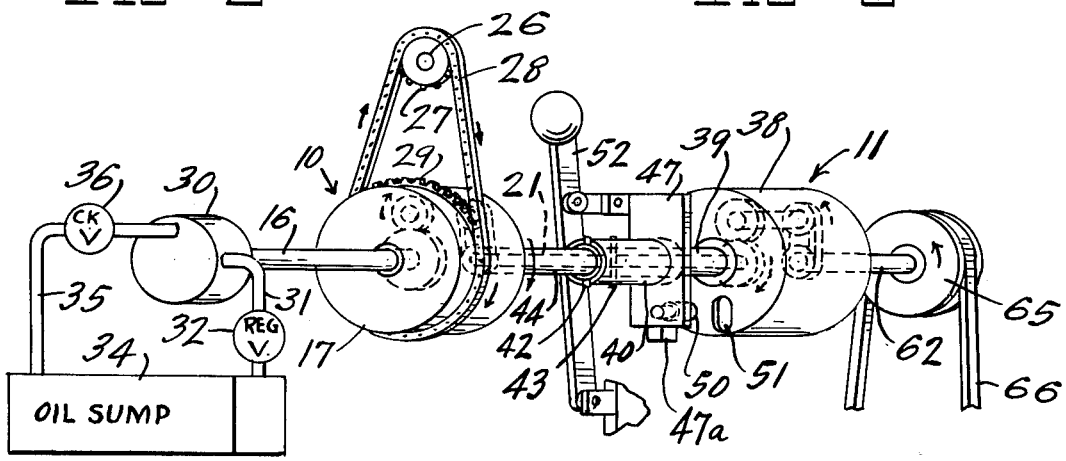
FIG-4-

VARIABLE SPEED POWER TRANSMISSION FOR SMALL VEHICLES AND THE LIKE

This application is a continuation-in-part of my earlier copending application Ser. No. 592,384, filed July 2, 1975, now abandoned.

BACKGROUND OF THE INVENTION

The invention relates to power transmission devices, and more particularly to a transmission device capable of infinitely changing ratios and reversing rotation without disengaging and shifting gears.

Power transmission devices including a rotatable carrier member supporting a counter shaft for providing two different output shaft speeds are well known in the transmission art. See, for example, U.S. Pat. No. 602,253. The counter shaft on the carrier member usually includes a gear enmeshed with a gear on the input shaft and another gear enmeshed with a gear on the output shaft. Means are provided for engaging the carrier member for direct rotation with the input shaft, thereby driving the output shaft along with the carrier and the input shaft, or for restraining the carrier member against rotation, thereby driving the output shaft at a different speed from the input shaft. When the carrier member is neither driven or restrained, a non-driving or neutral mode is established. While such transmissions are useful for providing two output speeds, such as in an overdrive for a vehicle, they are limited to such uses and cannot provide variable speeds, reverse speeds or change ratios as does the present invention described below.

SUMMARY OF THE INVENTION

The present invention provides a variable speed forward and reversing transmission for use as a transmission-clutch for a garden tractor, lawn mower or other small service vehicle. In the preferred embodiment of the invention, the apparatus includes infinitely variable forward and reverse speeds, a principal forward speed, and a neutral.

The transmission system includes a primary transmission device and a secondary transmission device connected in series between the drive motor and the rotary load member to be driven. The primary transmission device provides the variable speed function, principally, while the secondary transmission device provides forward and reverse functions. Added is the feature of coupling the two transmission devices to provide a principal forward speed function, which is a more or less direct drive coupling of the driving and driven elements without varying the gear ratio. In the primary transmission device, a pump shaft, an output shaft and a housing or carrier member are all mounted for rotation about a common center line. Mounted within the housing, spaced from and parallel to the pump and output shafts, is a rotatable counter shaft to which are affixed a gear and a sprocket in driving engagement with a gear on the pump shaft and a sprocket on the output shaft, respectively. The pump shaft is connected to a relatively infinitely variable load device. In the preferred embodiment illustrated herein, this device is a hydraulic pump of conventional design which includes a housing with a fluid inlet to a pump chamber in which a rotary impellor driven by the pump shaft expends energy in pumping the fluid to the fluid outlet. The pump inlet and outlet are respectively interposed in a fluid conduit circuit extending through the pump. The variable load (resistance of the pump shaft) is created by a flow regulating valve in the circuit. To maintain fluid in the system, the circuit also includes a fluid sump (reservoir) and preferably a cooling device, such as cooling coils, radiator, or the like, commonly used in hydraulic fluid systems, such as in automotive hydraulic transmissions.

Rotary power from the drive motor is applied for rotating the housing of the primary transmission device. The gear ratios between the pump driving gear, gears on the counter shaft and gear on the output shaft of the primary device determine principally the designed, predetermined gear ratio of the transmission. In the example set forth hereinafter, a gear ratio of 1:5 is given.

Setting the flow regulator valve in the pump circuit in full "open" position, the primary transmission output shaft assumes a neutral mode. rotation. As the flow regulator valve is progressively closed, the gear ratio changes and is capable of any desired adjustment. Within the range of the gear transmission, the gear ratio changes are virtually infinite between "open" and "closed" positions of the flow regulating valve for the pump. This results in a smooth transition from low ratio to a high ratio with no plateaus or shift points common in conventional transmissions. At the point where this regulator valve is in "closed" position, the primary transmission delivers its full gear ratio, which for the example just mentioned is 1:5.

The gear ratio change may be accomplished manually or automatically. Manual operation involves physically operating the flow regulating valve in the hydraulic pump circuit. Automatic operation may be accomplished by use of an engine governor connected to adjust the flow regulating valve responsive to change in the engine speed.

The secondary transmission device is constructed similarly in part to the primary device. The housing of the secondary device is mounted for rotation about a center line common with the output shaft of the primary device, the output shaft extending from the primary housing into the secondary housing. Mounted within the secondary housing, spaced from and parallel to the primary output shaft is a rotatable counter shaft to which are affixed a gear and a sprocket in driving engagement with a gear on the primary output shaft (which is the input shaft for the secondary device) and a sprocket on the output shaft of the secondary transmission, respectively. The driven load is connected by a chain or belt on the secondary output shaft.

A slotted sleeve device splined (keyed) on a hub portion of the secondary housing is provided between the primary and secondary transmissions and manipulated along the shaft extending therebetween. The adjacent hub of the primary housing is provided with a lateral pin engageable with the slot of the sleeve. A second such pin is carried on the shaft connecting the two transmissions and spaced toward the secondary transmission from the other pin. By a shift lever mechanism, the slotted sleeve may be shifted along the spline between the several positions.

In one of three driving positions, the two transmission housings and the output shaft from the primary transmission are keyed together through the two pins and slotted sleeve. This produces a nonvariable output mode of 1:1 gear ratio between the speed at which the drive motor rotates the primary transmission housing and the speed of the output shaft of the secondary transmission.

In a second setting, the secondary transmission housing is keyed only to the output shaft from the primary transmission. This results in a forward speed having a variable output depending upon the load placed on the pump shaft of the primary transmission.

In a third setting for the sleeve along the spline, the housings for the primary and secondary transmissions and the output shaft from the primary transmission are each disengaged from each other. Simultaneously, the secondary housing is held preventing rotation thereof. This is conveniently done by the shift mechanism engaging lugs thereon in detent means along the adjacent face of the secondary housing. The secondary transmission device functions to "reverse" the secondary output shaft while the primary transmission functions to provide a variable gear ratio depending for its specific ratio upon the loading placed upon the pump shaft.

The primary housing may be driven from the inside or the outside thereof and either clockwise or counterclockwise directions of rotation. The embodiment herein illustrated is designed such that in "forward" mode of operation, the input to the transmission system is driven in the same direction as the output shaft rotation. However, one of the transmission devices, secondary or primary, may be designed for the use of three gears in the drive connection between the counter shaft and the respective output shaft of that unit, replacing the sprockets and chain, whereby the direction of rotation of the drive motor and the output shaft of the transmission in the "forward" mode of the secondary transmission device are the same.

The transmission of the invention requires but one control unit, exclusive of the shift lever, and no friction clutches, band clutches, torque converters, or the like are needed.

The apparatus of the invention thus provides a primary forward speed (1:1 ratio), and an infinitely variable range of forward and reverse speeds from the primary speed to slower speeds. During operation at the faster speeds, energy is of course dissipated through the resistance valve in the pump where heat is generated through friction. Thus, the application of the transmission will be primarily in small vehicles which are normally operated in a single forward gear, but wherein temporary slower speeds are often necessary at full engine torque. The transmission is therefore useful in lawn tractors and other small vehicles, including electrically operated vehicles wherein one principal unidirectional motor speed is developed.

DESCRIPTION OF THE DRAWINGS

FIG. 1 is a sectional plan view, in part schematic, of a power transmission according to the invention, illustrating in solid outline the setting of the shift device thereof for primary speed (1:1 gear ratio) "forward" mode of operation;

FIG. 2 is a fragmentary sectional view of the shift device of FIG. 1 in another setting for "forward" variable gear ratio mode of operation;

FIG. 3 is a fragmentary sectional view like FIG. 2 showing still another setting of the shift device for "reverse" mode of operation; and FIG. 4 is a perspective view, in part schematic, of the power transmission of FIG. 1.

DESCRIPTION OF THE PREFERRED EMBODIMENTS

In the drawings, FIG. 1 may be considered a plan view of the power transmission apparatus according to the invention. The apparatus includes a primary transmission device 10 and a secondary transmission device 11 each rotatably mounted on structural members of a vehicle in which the transmission apparatus is incorporated. The primary transmission 10 is rotatably mounted in a bearing 12 journaled in vehicle member 13 and bearing 14 journaled in member 15. Rotatable on and with respect to a pump shaft 16 is a housing 17 of the primary transmission which supports an internal housing shaft 18 (also referred to as counter shaft 18) parallel to the pump shaft 16. Counter shaft 18 is rotatable in housing 17 and is driven and is driveably connected with gear 19 keyed thereon in mesh with gear 20 keyed on pump shaft 16. Preferably, gears 19 and 20 are of different diameter, the gear 20 on the pump shaft being the larger, which provides the most efficient means of control by the pump. An output shaft 21 is rotatable independently of the bearing 14 on the opposite axial side of housing 17 and is coaxial with the pump shaft 16. A sprocket 22 is keyed on the inner end of shaft 21 for rotation together. A similar sprocket 23 is keyed on counter shaft 18 and is driven by the latter. The sprockets 22 and 23 are connected for rotation together by endless chain 24. Preferably, one of the internal connections comprises enmeshed gears (such as 19, 20), and the other comprises chain-connected sprockets (such as 22, 23), so that the direction of rotation of the output shaft 21 is that of the housing 17 when the counter shaft 18 rotates, forming the forward speed of the transmission apparatus. The relative sizes of the gears 19, 20 and of the sprockets 31, 32 are chosen according to the desired gear ratio of the transmission. As stated the larger gear 20 is selected for the pump shaft 16. As an example, the gears in the primary transmission may provide a ratio of 1:5, but a higher or lower ratio could be used. Preferrably, the gear ratio is different than 1:1. A counterweight 25 may be included on the housing to counter balance countershaft 18, gears 19, sprocket 23 and chain 24.

The housing 17 of primary transmission device 10 is rotatably driven through a power shaft 26 rotatably supported in a part of the vehicle member 13 and connected to a power source, such as the engine of the vehicle (not shown). An input rotary drive means for the housing 17 is provided by the drive gear 27 running the endless drive chain 28 reeved about the annular gear 29 fastened securely on the perimeter of housing 17.

A variable resistance means is connected with shaft 16 for restraining rotation of the shaft and gear 20 thereon. The variable resistance in the illustrated embodiment herein comprises an hydraulic pump 30 to be driven by pump shaft 16. When pump shaft 16 is rotated, the pump 30 circulates a fluid through a closed circuit conduit which includes line 31 in which is positioned an adjustable flow regulating valve 32. For preventing or substantially preventing rotation of the gear 20, the valve 32 may be completely closed. This causes the driven housing 17 to run gear 19 on gear 20 and rotate counter shaft 18. Shaft 18 drives output shaft 21 through the sprockets 23, 22 and chain 24. Assuming clockwise rotation of the housing 17, this causes the output shaft 21 to be driven clockwise; and assuming the secondary transmission device (to be presently described) is in the "forward" mode of operation, completely closing valve 32 in the pump circuit produces the maximum variable gear ratio (1:5 in the stated example) of the primary transmission device 10. On the other hand, by fully opening the valve 32 to reduce the resistance load of pump 30 to its minimum, neutral mode is obtained. Therefore, through the manipulation of the single control (valve 32), the rotation of the output shaft 21 can be controlled very precisely without varying the speed of the engine. An almost infinite combination of gear ratios designed into the transmission are available; in the example above given, any gear ratio between 1:1 and 1:5 can be obtained.

In addition to providing variable speeds, the variable resistance pump of this invention also enables a smooth transition from neutral, wherein the vehicle is at rest, to the maximum forward speed. This transition is accomplished by closing the valve 32, relatively gradually. The valve 32 may of course be operated manually by a remote handle (not shown) positioned conveniently for the operator of the vehicle.

The fluid in the circuit through pump 30 will generate heat, as energy is dissipated in the pump. A cooling device 33 of known type may be incorporated to remove heat from the fluid as it enters or is in the fluid sump 34. The fluid circuit also includes line 35 connected to the inlet side of pump 30. A fluid check valve 36 is interposed in line 35 between the sump 34 and the pump inlet port to prevent reverse flow of the fluid through the pump and provide full hold back potential to the pump shaft 16.

Valve 32 may of course be manually operated, as indicated earlier, or automatically. Automatic gear ratio change is available with the invention by connecting the valve 32 for adjustment in response to the engine governor (indicated schematically on FIG. 1). By utilizing known control elements, as indicated, operation of the valve may be subject to changes in the engine speed for varying (adjusting) the transmission gear ratio to maintain a constant output drive speed. In any event a variation in R. P. M. may be produced between the input and the output shafts of the apparatus. With given horsepower, a variable torque is produced by the variable R. P. M. response. The variable R. P. M. results by varying gear ratios without changing gears in a conventional sense of the term.

The secondary transmission device 11 is structurally similar, in many respects, to the primary transmission device 10, just described; but, its function is different. It serves as a reversing device through which the power output of the primary transmission is connected to the load on the vehicle, through the output drive means for the power transmission. Secondary transmission device 11 includes a housing 38 rotatably mounted on a common axis of rotation with shafts 16 and 21. At the left side of housing 38 (FIG. 1) a splined hub shaft 39 thereof is attached to a hollow sleeve member that is complementarily internally splined for driving the housing at times. The sleeve member 40 is thus mounted for sliding movement along hub shaft 39 and is keyed through the corresponding splines for rotation together with shaft 39 at all times. The outer end of sleeve member 40 includes a longitudinal slot 41 to receive and engage therewith one or both of the radial pins 42 and 43. Pin 42 is secured firmly as two radially opposed segments near the end of hollow shaft 44, which is an integral part of housing 17 of the primary transmission device. Pin 42 therefore rotates together with housing 17 at all times that the latter is driven. The pin 43 extends through shaft 21 and is axially spaced from the location of the first pin 42. Pin 43 is also engageable at times in slot 41 of the sliding sleeve member 40.

The slotted sleeve 40 also rotates in a bearing support in the shift lever support member 45, which may be attached as a part of a longitudinal vehicle member 46 to which support members 13 and 15 are likewise securely fastened. In a sense, these members provide a part of the frame work supporting the transmission apparatus. Sleeve 40 is engaged by a U-shaped, nonrotatable shift fork 47 slidable linearly in the hollow section of lever support member 45 along the surface 49 thereof and is guided by roller 47a in movement between two extreme positions defined at the left hand side (FIG. 1) adjacent wall 48 and the right hand side (FIG. 3) whereat the protruding lug 50 of the fork is engaged in the detent slot 51 on the near face of housing 38. Shift fork 47 is connected to the shift handle 52 by the link 55. Handle 52 is pivoted at its lower end at the pivot pin 53 in the boss 54 on the member 45 and is moveable between the three main operating positions (represented by solid and dotted outline on FIG. 1).

The output shaft 21 of the primary transmission device extends into housing 38 of the secondary device. Gear 56 is keyed on the end of shaft 21 and is driven thereby in mesh with gear 57 keyed on counter shaft 58. A sprocket 59 is also keyed on shaft 58 and drives chain 60 running on sprocket 61, which is keyed on the inner end of the output drive shaft 62. Housing 38 has an end bearing support member 63 journaled in the frame member 64 and drive shaft 62 is rotatable in bearing member 63 for rotation independent of housing 38. A drive pulley 65 transmits power applied through the transmission to a V-belt 66. Any suitable drive means may be used from shaft 62 to transmit the power, such as a gear and chain, worm and pinion, gear set, or the like. As in the primary housing, the housing 38 may include a counterweight 67 to counterbalance its countershaft 58, gear 57, sprocket 59 and chain 60.

By way of summary, the apparatus is illustrated in the perspective view of FIG. 4. The primary housing 17 is driven, for example, in a clockwise direction by the power input of chain drive 28. This produces a clockwise rotation of the gear 19 and sprockets 22, 23 rotating shaft 21 the same direction. Assuming the pin 43 of shaft 21 is locked in sleeve-slot 41, the housing 38 of the secondary transmission is also driven clockwise which drives the output shaft in the same direction of rotation. If the resistance of shaft 16 is varied through the restriction of the flow control in the pump circuit, the gear ratio of the drive in the forward mode (clockwise rotation of shaft 62) is varied and speed of shaft 62 is varied accordingly. Upon releasing the pin 43 from sleeve-slot 41, shaft 21 is rotating independently and engagement of the shift lug 50 on the housing detent 51 holds housing 38 against rotation. This will cause shaft 21 to drive gear 57 and its countershaft in the opposite, counterclockwise direction, which direction is transmitted by sprockets 59, 61 to now rotate output shaft 62 counterclockwise. In other words, the reverse mode is established in secondary transmission 11 and in manipulation of the hydraulic flow regulating valve 32, the variable speed reverse drive is in operation. By locking both pins 42 and 43 in the sleeve-slot 41, the primary housing 17 and shaft 21 rotate together at the same speed and the variable effect of the pump resistance load is bypassed; that is, the transmission is in primary forward mode at 1:1 gear ratio.

It should be readily apparent that several options are available utilizing the principles of the invention. The disclosed preferred embodiment provides a means for forward and reverse operation. However, if uni-directional drive is desired, the output shaft of the primary transmission may be used as the output drive for the vehicle or implement. By either adjusting the resistance to virtually zero load on pump shaft 16, or by a coupling device, such as the one illustrated, the primary housing 17 and output shaft 21 are locked together, the principal drive speed (1:1 gear ratio) may be utilized. Alternately, uncoupling the two (housing 17 and shaft 21) and/or increasing the resistance load of the pump on shaft 16, the variable gear ratio drive feature of the invention is brought into operation.

Having described the invention in some detail with respect to one embodiment thereof, and further indicated some modifications thereof, other and further modifications and variants of the invention will occur to those skilled in the art and which can be effected within the spirit and scope of the invention, as described hereinabove, and as defined in the appended claims.

What is claimed is:

1. A power transmission apparatus, comprising
    a first shaft,
    a second shaft,
    a rotatable housing member supported for independent rotation with respect to the first and second shafts,
    a housing shaft rotatably supported in the housing and in spaced, parallel relation to the first and second shafts,
    a first gear means in the housing comprising a gear connected to the first shaft for rotation therewith, and a second gear rotatably connected with said housing shaft, said gears being connected in driving relation one to the other,
    a second gear means in the housing comprising a gear rotatably connected to said housing shaft and a gear connected for rotating the second shaft, said gears being connected in driving relation one to the other,
    rotary drive means connected to the housing for rotating the latter,
    a variable resistance means connected to the first shaft operable for resisting rotation thereof,
    the second shaft being driven at variable speed responsive to variations of resistance of said resistance means, and
    means connected to said resistance means operable for varying the resistance of rotation of the first shaft.

2. The power transmission of claim 1 including
    a third shaft connected for rotation with the housing, said third shaft being adjacent the second shaft and independently rotatable with respect thereto,
    an output rotary drive means for applying rotary power, and
    means for alternatively connecting said output drive means
    a. to said second shaft for rotation at a different speed from the rotary speed of the housing, or
    b. to said third shaft for rotation at the same speed as the housing.

3. The power transmission of claim 1, in which the variable resistance means comprises
    a rotary fluid pump, the pump being connected to the first shaft for rotation thereby,
    a source of fluid, and
    a conduit circuit connected between the pump outlet, said source and the inlet of the pump,
    said means operable for varying the resistance comprising an adjustable flow regulating valve means interposed in said conduit circuit for regulating the flow of fluid through said circuit, thereby varying the load on said pump.

4. The power transmission of claim 3, including a fluid check valve connected in the conduit circuit preventing reverse fluid flow therein.

5. The power transmission of claim 1, in which the gears of said first gear means are connected in driving relation by their teeth running in mesh with each other.

6. The power transmission of claim 5, in which said first gear means is characterized by the gear on the first shaft being of substantially larger diameter than said second gear on the housing shaft.

7. The power transmission of claim 1 in which the gears of said second gear means are connected in driving relation by the endless chain meshing with the teeth of the gear on the housing shaft and the gear on the second shaft.

8. The power transmission of claim 1, wherein the housing includes
    a hollow rotary shaft rotatable therwith concentric and independently rotatable with respect to said second shaft,
    an output rotary drive means for applying rotary power from the transmission,
    a reversing device connected to said output drive means, and
    means for alternatively connecting the reversing device
    a. to said second shaft for rotation selectively in either direction, or
    b. to said third shaft for rotation at the same speed as the housing in one direction.

9. The power transmission of claim 8 wherein the reversing device when connected to said second shaft for rotation of the output drive means in either direction is at a different speed from the rotary speed of the housing.

10. The power transmission of claim 8 in which the reversing device comprises
    a rotatably mounted second housing have a hollow input shaft rotatable therewith,
    an output shaft rotatable in the housing and connected to the output rotary drive means,
    an internal shaft parallel with the input shaft and spaced therefrom, said second shaft being concentric with the housing input shaft and extending into the housing,
    a gear fastened on the second shaft and rotated thereby,
    a gear on the internal shaft connected for rotation together,
    a second gear on the internal shaft rotated thereby,
    a gear on the output shaft, the second gear and gear on the output shaft being drivably connected together, and
    means for alternatively
    a. connecting the second and third shafts and input shaft for rotation together, thereby driving the output shaft in one direction at the same speed as the rotation of the first-mentioned housing, or
    b. connecting the second shaft and the input shaft of the second housing for rotation together thereby driving the output shaft in one direction at a variable speed with relation to the rotation of the first-mentioned housing, or c. connecting the second shaft to the output shaft and holding the second-mentioned housing stationary, thereby driving the output shaft in the other direction at a variable speed.

11. A power transmission comprising in combination a primary transmission device having variable speed output drive, a secondary transmission device in series with said primary device and having forward and reverse modes, said secondary device being connected to said output drive of the primary device and to a driven rotary load, a power drive means connected to operate the said primary device in one direction of rotation, a variable control means consisting of a fluid pump and a flow regulation means connected to the primary transmission device for varying the speed output thereof independent of variation of the driving speed of the power means, and a control shift device for connecting the primary and secondary transmissions to produce a direct drive therebetween in the forward mode of the secondary device and a variable drive of multiple gear ratio between the two in either of the forward and the reverse modes of the secondary device.

12. A power transmission apparatus comprising a first shaft for attachment to a means for arresting rotation thereof, said means applying a varying load resisting rotation of the first shaft, an output shaft coaxial with said first shaft for attachment to a driven rotary load, a housing journaled for rotation on an axis coaxial with said shafts, a rotary drive means connected to rotate said housing, a counter shaft carried by said housing on an axis parallel to and spaced from the axis of rotation of said housing, a pair of engaged spur gears interconnecting said first shaft and said counter shaft to drive said counter shaft in the same direction as the said housing, a drive chain interconnecting said counter shaft with said output shaft whereby said output shaft is driven by said counter shaft in the same direction as said housing.

13. The power transmission apparatus of claim 12, wherein the speed of the output shaft varies as a function of the resistance against rotation applied to the first shaft by said means, the output shaft rotating at a different speed than the speed of rotation of the housing.

14. A power transmission apparatus, comprising a primary transmission device having a housing rotatable on a central axis about an input shaft and an output shaft, the housing including a counter shaft spaced from and parallel with said central axis, a gear connected on the input shaft for rotating therewith and operatively connected by gear means for rotating the counter shaft, said counter shaft being connected by drive means to rotate said output shaft;

a secondary transmission device having a housing rotatable on a central axis common with the axis of said primary transmission and spaced therefrom, the housing including a counter shaft spaced from and parallel with said central axis, a gear rotatable in said housing and connected to said output shaft of said primary transmission for rotation thereby about said central axis, an output shaft on the central axis rotatable independently of the housing, said gear being operatively connected by rotary driving elements for rotating the counter shaft, and the counter shaft being connected by rotary driving elements to the output shaft for rotating the latter;

a variable resistance means operatively connected to the input shaft of the primary transmission device for applying resistance to rotation of the input shaft at selected times;

a rotary drive means connected to the housing of the primary transmission housing for rotating it about its central axis; and a coupling device between the first and second transmission devices comprising a coupling member encircling said primary output shaft and connected to the secondary transmission housing for rotating therewith, and for reciprocating axial movement along said shaft, means carried by said primary output shaft engageable by said coupling member, means carried by the primary transmission housing engageable by said coupling member, means for axially moving said coupling member at times between engagement with said means on said primary output shaft, and engagement with both said last-mentioned means and the means carried by said primary housing, and disengagement with both said means, and holding means engageable with the housing of the secondary transmission to prevent rotation of said housing.

15. The power transmission apparatus of claim 14 in which said variable resistance means comprises a fluid pump operatively connected to the input shaft, a fluid conduit circuit from the pump outlet to the pump inlet, and a flow regulating means in said circuit.

16. The power transmission apparatus of claim 15 including a one way check valve in said circuit between the flow regulating means and the pump inlet preventing reverse flow of fluid from the inlet.

17. The power transmission apparatus of claim 14 wherein the coupling member of said coupling device comprises a hollow sleeve encircling said primary transmission output shaft, said sleeve including an axially extending slot, and wherein said means carried by said primary output shaft comprises a transverse pin through said shaft engageable in said slot of the hollow sleeve, and the means carried by the primary transmission housing comprises a hub shaft on said housing encircling the output shaft and a radially protruding pin member thereon engageable in said slot of the hollow sleeve.

18. The power transmission of claim 14, in which the means for moving the coupling member comprises a shift device operatively connected to the coupling member for reciprocating it between coupling engagement with said primary output shaft means and said primary housing means and disengagement with said means, and operatively connected to said holding means for engaging the latter upon movement of the coupling member in disengaging it from both said means.

19. The power transmission of claim 18 in which the holding means comprises a detent in the second transmission housing and a lug carried by the shift device engageable in said housing detent upon movement of the shift device disengaging both said means on the primary output shaft and primary housing, whereby the secondary housing is held against rotation only upon disconnecting the primary and secondary housings and the primary input shaft from each other.

* * * * *